United States Patent
Butterstein et al.

(10) Patent No.: US 11,182,386 B2
(45) Date of Patent: Nov. 23, 2021

(54) OFFLOADING STATISTICS COLLECTION

(71) Applicant: International Business Machines Corporation, Armonk, NY (US)

(72) Inventors: Dennis Butterstein, Stuttgart (DE); Oliver Benke, Stuttgart (DE); Tobias Ulrich Bergmann, Weinstadt (DE); Felix Beier, Haigerloch (DE); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/827,891

(22) Filed: Mar. 24, 2020

(65) Prior Publication Data

US 2021/0303575 A1 Sep. 30, 2021

(51) Int. Cl.
*G06F 16/245* (2019.01)
*G06F 16/2453* (2019.01)

(52) U.S. Cl.
CPC .............. *G06F 16/24545* (2019.01)

(58) Field of Classification Search
CPC ........ G06G 16/24543; G06F 16/84553; G06F 16/27; G06F 16/24545
USPC .................. 707/719, 999.002, 713, 718, 720
See application file for complete search history.

(56) References Cited

U.S. PATENT DOCUMENTS

| | | | |
|---|---|---|---|
| 7,991,763 B2 | 8/2011 | Bestgen et al. | |
| 8,504,522 B2 | 8/2013 | Wu et al. | |
| 9,436,734 B2 * | 9/2016 | Clifford | G06F 11/3419 |
| 2007/0022092 A1 * | 1/2007 | Nishizawa | G06F 16/24568 |
| 2008/0256025 A1 * | 10/2008 | Bestgen | G06F 16/245 |
| 2012/0109889 A1 | 5/2012 | Wu et al. | |

(Continued)

FOREIGN PATENT DOCUMENTS

CN 108153776 6/2018

OTHER PUBLICATIONS

Disclosed Anonymously, A method for time prediction on database system statistics collection and SQL rebind by machine learning, IPCOM000254064D, May 31, 2018, 5 pages.

(Continued)

*Primary Examiner* — Baoquoc N To
(74) *Attorney, Agent, or Firm* — Daniel Morris; Otterstedt, Wallace & Kammer, LLP (57) ABSTRACT

Methods and systems for generating database statistics. Table statistics in a metadata catalog of a source database system are observed, statistics generation costs utilizing a target database system are estimated, and source statistics generation costs utilizing a source database system are estimated. The statistics generation costs are compared and statistics generation queries by the target database system are triggered in response to the statistics generation costs utilizing the target database system having a predefined relationship with the source statistics generation costs utilizing the source database system. The statistics generation queries are performed by the target database system in response to the triggering by the source database system. The generated statistics are sent from the target database system to the source database system, the table statistics in a metadata catalog are updated based on the generated statistics, and the updated table statistics are used to optimize a query plan.

20 Claims, 5 Drawing Sheets

(56) References Cited

U.S. PATENT DOCUMENTS

| | | |
|---|---|---|
| 2014/0136516 A1* | 5/2014 | Clifford .............. G06F 11/3419 |
| | | 707/719 |
| 2015/0066972 A1 | 3/2015 | Liu et al. |
| 2016/0246854 A1* | 8/2016 | Pathak ................ G06F 16/2462 |
| 2016/0275150 A1 | 9/2016 | Bournonnais et al. |
| 2017/0249354 A1 | 8/2017 | Lee et al. |
| 2019/0034496 A1 | 1/2019 | Acosta et al. |

OTHER PUBLICATIONS

Stillger et al., LEO-DB2's learning optimizer, In VLDB, vol. 1, pp. 19-28. 2001.
Peter Mell Timothy Grance, The NIST Definition of Cloud Computing. National Institute of Standards and Technology, Sep. 2011. pp. 7.
Stillger M, Lohman GM, Markl V, Kandil M. LEO-DB2's learning optimizer. InVLDB Sep. 11, 2001 (vol. 1, pp. 19-28).
Jiang, Xiaoqing; International Search Report, National Intellectual Property Administration, PRC, PCT/IB2021/051531, dated Jun. 1, 2021, pp. 1-6.

* cited by examiner

OFFLOADING STATISTICS COLLECTION

BACKGROUND

The present invention relates to the electrical, electronic and computer arts, and more specifically, to relational databases and the like.

Database systems conventionally schedule database queries in a query plan. Traditionally, the query plan is represented as a tree of relational operators. In order to reduce cost, improve performance, and the like, an optimizer is often used to generate a more optimal plan for performing the queries. For example, statistics regarding the distribution of data within the tables of the database may be used to facilitate an optimization of the query plan. The plan may be optimized based on cost with the goal of determining the least expensive query plan for performing the received queries.

The statistics may be based on the distribution of data within the tables and indexes of the database, the commonality of data, and the like. The statistics may be generated based on a single column or a plurality of columns. The statistics may include a histogram representing the distribution of values for a column and, in some cases, a correlation of values between columns. Most relational databases today rely heavily on this statistical information to calculate the fastest execution plan to process queries. Conventional database products implement some capability for query tracking and query analysis, relying on this particular data. The quality of the plan the optimizer picks is thus dependent on the correctness of the statistical data collected. The initial collected statistical data deviates over time, as queries alter the state of the database. As a consequence, the quality of the picked plans decreases.

To keep the quality of the chosen plans high, it is necessary to update the statistical data regularly. These updates are associated with costs: the database system therefore, for example, may select tables to collect statistics for, sample the data of the selected tables, and extrapolate the collected information based on the size of the table. This data then enables the optimizer to estimate or predict a count of rows in a query result. In turn, this enables the optimizer to generate an efficient query plan. For example, the optimizer may select a more effective index scan operator for the query plan.

SUMMARY

Principles of the invention provide techniques for offloading statistics collection. In one aspect, an exemplary method includes the operations of observing table statistics in a metadata catalog of a source database system; estimating statistics generation costs utilizing a target database system and estimating source statistics generation costs utilizing a source database system; comparing the statistics generation costs utilizing the target database system and the source statistics generation costs utilizing the source database system; triggering, by the source database system, statistics generation queries by the target database system in response to the statistics generation costs utilizing the target database system having a predefined relationship with the source statistics generation costs utilizing the source database system; performing, by the target database system, the statistics generation queries in response to the triggering by the source database system; sending the generated statistics from the target database system to the source database system in response to the triggering by the source database system and the performance of the statistics generation queries; updating the table statistics in the metadata catalog based on the generated statistics; and using the updated table statistics to optimize a query plan.

In one aspect, a non-transitory computer readable medium comprises computer executable instructions which when executed by a computer cause the computer to perform the method of observing table statistics in a metadata catalog of a source database system; estimating statistics generation costs utilizing a target database system and estimating source statistics generation costs utilizing a source database system; comparing the statistics generation costs utilizing the target database system and the source statistics generation costs utilizing the source database system; triggering, by the source database system, statistics generation queries by the target database system in response to the statistics generation costs utilizing the target database system having a predefined relationship with the source statistics generation costs utilizing the source database system; performing, by the target database system, the statistics generation queries in response to the triggering by the source database system; sending the generated statistics from the target database system to the source database system in response to the triggering by the source database system and the performance of the statistics generation queries; updating the table statistics in the metadata catalog based on the generated statistics; and using the updated table statistics to optimize a query plan.

In one aspect, a system comprises a source database system, the source database system comprising at least one first processor, coupled to a first memory; a target database system, the target database system comprising at least one second processor, coupled to a second memory, and the system operative to perform operations comprising observing table statistics in a metadata catalog of a source database system; estimating statistics generation costs utilizing a target database system and estimating source statistics generation costs utilizing a source database system; comparing the statistics generation costs utilizing the target database system and the source statistics generation costs utilizing the source database system; triggering, by the source database system, statistics generation queries by the target database system in response to the statistics generation costs utilizing the target database system having a predefined relationship with the source statistics generation costs utilizing the source database system; performing, by the target database system, the statistics generation queries in response to the triggering by the source database system; sending the generated statistics from the target database system to the source database system in response to the triggering by the source database system and the performance of the statistics generation queries; updating the table statistics in the metadata catalog based on the generated statistics; and using the updated table statistics to optimize a query plan.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

accelerator database system optimized for processing statistical queries over large data sets;

efficient accelerator-based database statistics generation for a source database system by the accelerator (target) database system;

reduced central processing unit (CPU) consumption for the source database system;

ability to generate query-specific runtime statistics before the actual query is executed (statistics connections can be individually tailored since the tables used by a specific query are known); and no additional or dedicated systems needed to collect statistics.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
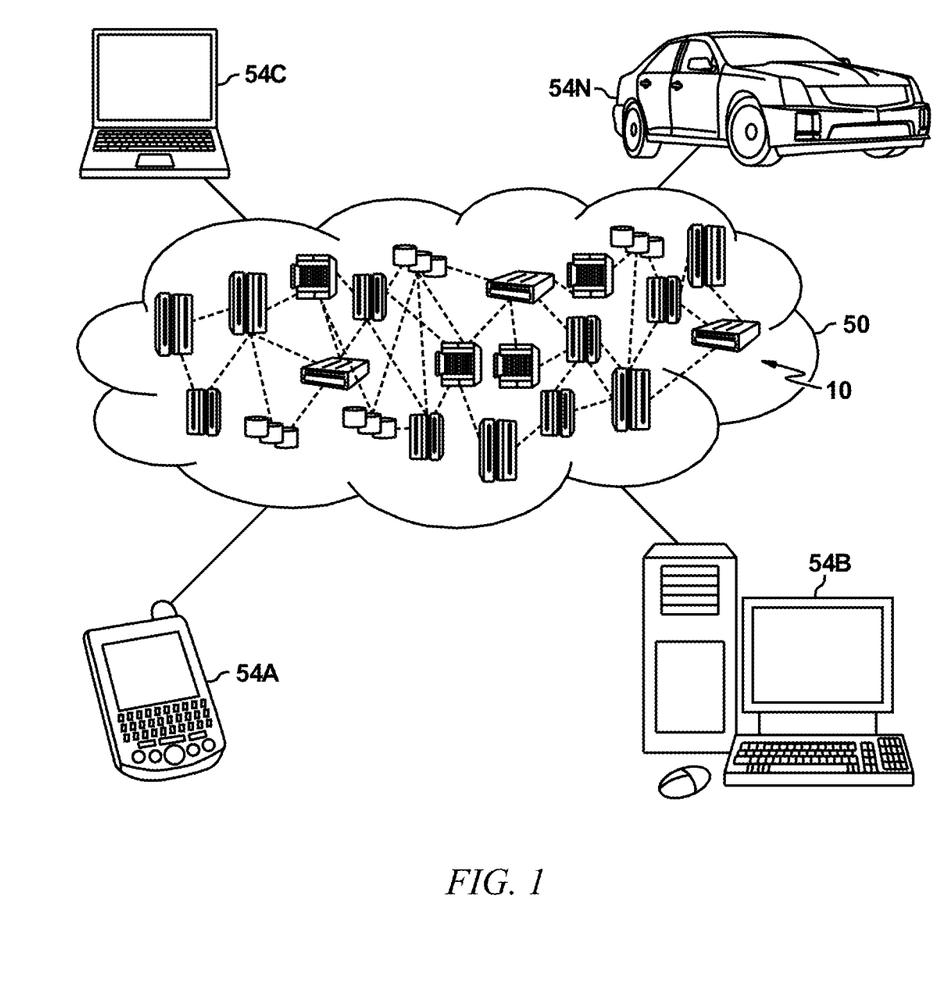
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
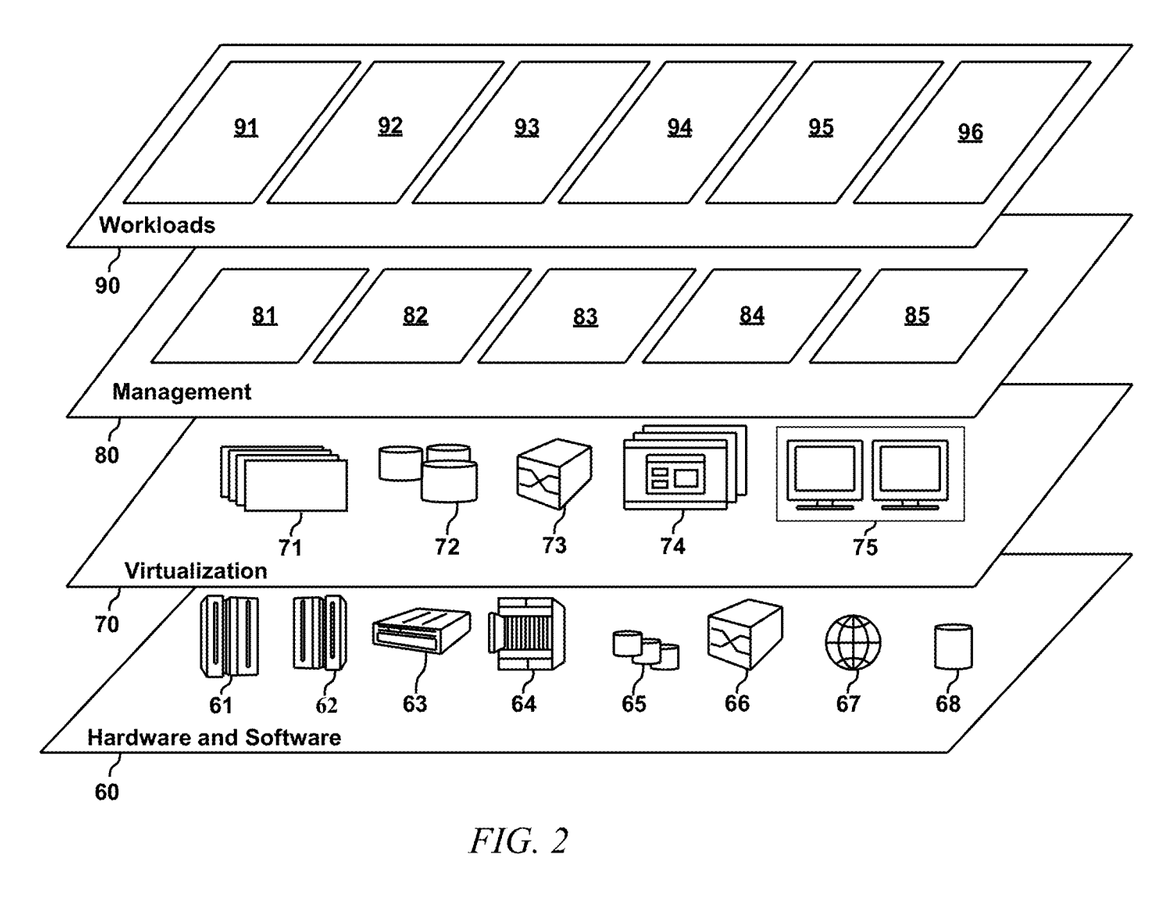
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database manager 96. It is to be emphasized that embodiments of the invention can be implemented in a cloud environment (such as in the database software 68 element in layer 60 and/or the database manager 96 in layer 90), in a non-cloud environment, or in a hybrid manner with portions in the cloud and portions in a non-cloud (e.g. local) manner.

Generally, apparatus, systems, and methods for offloading statistics generation and collection are disclosed useful, for example, for generating and utilizing database statistics. The statistics data that is generated is offloaded, for example, to an accelerator database system that is optimized for statistics-like queries by using a columnar layout of the database tables, caching data in-memory, utilizing data compression techniques, parallel processing, special indexing techniques, and the like. In one example embodiment, an accelerator database system (also referred to as a target database system herein) maintains and updates a statistics store for a production database system (also referred to as a source database system herein) incrementally, by capturing snapshots of the ongoing transactions of one or more database systems (such as Db2® database systems)(registered mark of International Business Machines Corporation, Armonk, N.Y., USA).

A dependable indication of whether statistical data of a particular table is out of date is the number of insert, update, and delete statements executed on a table. This can be determined by counting the corresponding queries per table. In one example embodiment, sampling is used to expedite the cardinality calculation. (In the context of databases, cardinality refers to the uniqueness of data values contained in a column. High cardinality means that the column contains a large percentage of totally unique values. Low cardinality means that the column contains a lot of "repeats" in its data range.) In one example embodiment, a larger sub-plan is executed in the target database system and run-time cardinalities collected during the execution in the target database system are used (tools such as, for example, the Learning Optimizer (LEO) collect such statistics; see, Stiliger, Michael et al. "LEO DB2's LEarning Optimizer." *VLDB* (2001)). If the execution of a sub-plan takes too long, thresholding can be applied to choose a local estimate instead of waiting for the exact cardinality.

The statistics may be generated incrementally, such that the statistics reflect the most current data, or may be generated when a statistics update is required. In one example embodiment, the amount of changes that are applied to the tables are tracked and, once a larger fraction (such as 15%, although such is a non-limiting example and the percentage can be configurable) of the table has been changed, a statistics collection task is triggered. In one example embodiment, a background task is scheduled to check if a table has changed, to check an amount of changes to a table, and the like at regular intervals.

In one or more embodiments, change information for the statistics data is extracted from the transactions and used to update a local statistics store. The statistics store is accessible by the production database system and hence supports query plan selection.

In one example embodiment, the accelerator database system performs statistics generation for the production database system. For example, when the cost of performing the statistics generation by the source database system is more expensive than the accelerator database system, the statistics generation can be offloaded to the accelerator database system. The statistics generated by the accelerator database system are used by the source database system, the accelerator database system, or both.

Figure 3:
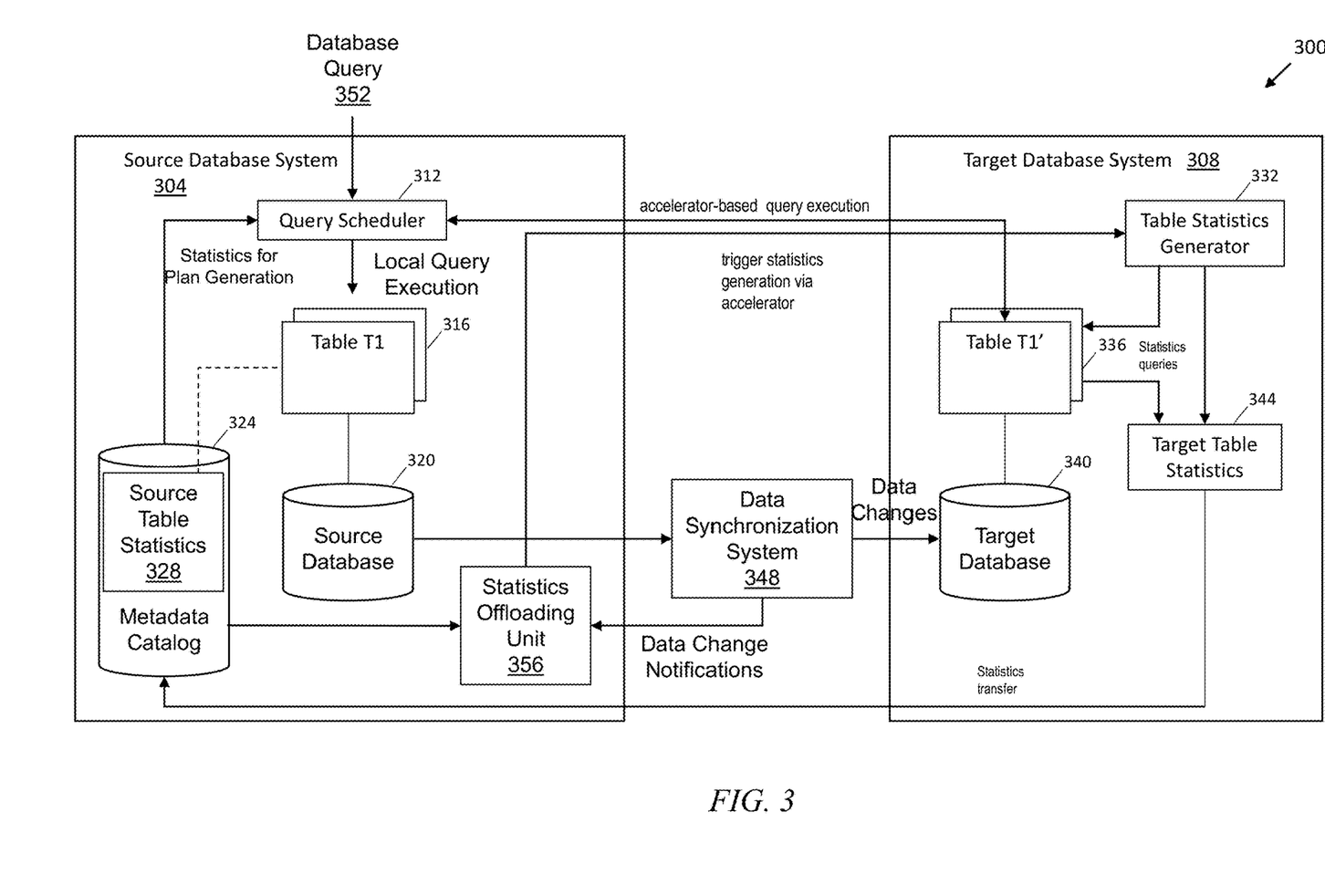
FIG. 3 is a block diagram of an example database system, in accordance with an example embodiment.

FIG. 3 is a block diagram of an example database system 300, in accordance with an example embodiment. A source database system 304 processes database queries 352 (referred to as queries 352 herein) received from applications and other entities. A query scheduler 312 generates a query plan to be performed locally (within the source database system 304) or remotely (within a target database system 308, as described more fully below). In one example embodiment, an optimizer within the query scheduler 312 optimizes the query plan with the goal, for example, of determining the least expensive query plan for performing the received queries. For example, a cost-based optimizer may utilize database statistics to facilitate optimization of the query plan. The statistics may be related to the distribution of data within tables 316 of the source database system 304, commonality of data, and the like.

Once generated, the query plan is performed by either the source database system 304 or the target database system 308. Local query executions are performed on one or more of the tables 316 within the source database 320. An accelerator-based query execution is performed on one or more of the tables 336 within the target database 340. A data synchronization system 348 synchronizes the tables 336 within the target database 340 with the tables 316 within the source database 320, which is a prerequisite to collect statistical data for improving query plan selection. For example, the data synchronization system 348 receives triggers from the source database 320 indicating that the data of tables 316 within the source database 320 should be transferred completely or in part to update the target database 340. In one example embodiment, the query scheduler 312, the table statistics generator 332, the data synchronization system 348, and the statistics offloading unit 356 are implemented with computer system executable instructions, such as program modules, executed by a computer system, such as a server. For example, the query scheduler 312 includes code implementing an optimizer (e.g. cost-based) that optimizes the query plan with the goal, for example, of determining the least expensive query plan for performing the received queries. The generator 332 includes code that implements the functionality discussed in the following paragraph. The system 348 includes code responsive to the just-mentioned triggers, for example. The statistics offloading unit 356 is responsible for detecting whether statistics need to be refreshed. In one example embodiment, the statistics offloading unit 356 abstracts the actual collecting implementation, e.g., by offloading it to the target (accelerator) database system 308 or collecting it locally in the source database system 304. That is, it implements various communication protocols for refreshing the statistics in the source database system 304.

As queries are executed, statistics within a source statistics table 328 of a metadata catalog 324 are created or updated. The statistics are then provided to the query scheduler 312 for use in optimizing the query plan. In one example embodiment, a statistics offloading unit 356 offloads tasks related to statistics generation to a table statistics generator 332 within the target database system 308. The table statistics generator 332 is sent, for example, a list of tables to be considered and the type of statistics that should be generated. In one example embodiment, this is translated into statistical queries by the table statistics generator 332. Alternatively, the statistics offloading unit 356 may implement the query generation component of the table statistics generator 332 itself and simply transmit the statistical queries in order to update the source table statistics 328.

In one example embodiment, statistics generation is only offloaded to the table statistics generator 332 if the cost of generating the statistics on the target database system 308 is less expensive than generating the statistics on the source database system 304. In one example embodiment, statistics generation is always offloaded to the table statistics generator 332; other embodiments can take a different approach. In one example embodiment, the same mechanism is used for application query execution as for determining when to offload statistics generation. If the statistics offloading unit 356 generates the statistics queries itself, it can simply schedule the queries via the query scheduler 312 (as in the user query case). The query scheduler 312 analyzes the query statements and decides which system (the source database system 304 or the target database system 308) is best-suited to execute them. In one example embodiment, the statistics offloading unit 356 acts like a regular database client that receives the statistics query results and updates the statistics no matter where they have been collected. In one example embodiment, additional details of this particular internal query execution use case are considered, e.g., providing a special cost function for statistics queries (which may have different optimization goals, e.g., minimizing runtime/minimizing resource utilization on the source database system 304 and the like). In any case, the offloading strategies may be modeled with the help of a cost function that indicates the "expensiveness" of offloading a corresponding task in terms of the cost of resources needed for the task.

Within the target database system 308, as queries are executed, statistics within a target table statistics 344 are created or updated. In one example embodiment, the target database system 308 includes a metadata catalog (not shown) performing similar functionality for the target database system 308 as the metadata catalog 324 performs for the source database system 304. In addition, statistics are created and/or updated in the target table statistics 344 in response to a trigger generated by the statistics offloading unit 356. The trigger may be generated periodically, when a particular amount of changes to the tables are detected in the source database system 304, and the like. In one example embodiment, the target database system 308 pushes statistics to the source database system 304 periodically, when a target database system 308 generates or updates statistics in response to an internal request, and the like. In any case, the statistics generated in the target database system 308 are transferred to the source statistics table 328 for use by the query scheduler 312 in optimizing the query plan.

Figure 4:
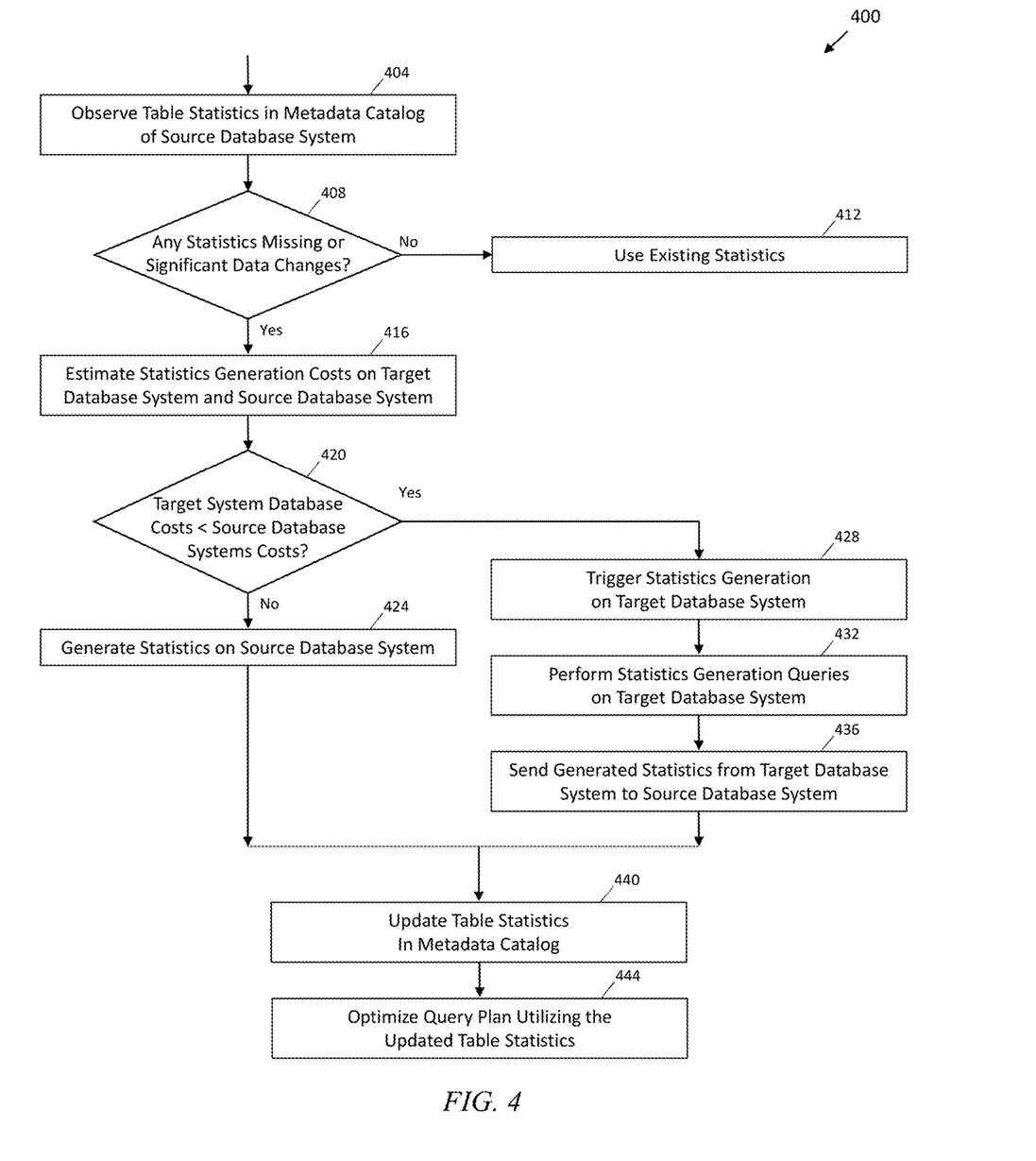
FIG. 4 is a flowchart for an example method for generating and utilizing database statistics, in accordance with an example embodiment.

FIG. 4 is a flowchart for an example method 400 for generating and utilizing database statistics, in accordance with an example embodiment. In one example embodiment, table statistics in a metadata catalog 324 of a source database system 304 are observed (operation 404). A check is performed to determine if any statistics are missing or if there are significant data changes (decision block 408). For example, if there is nothing in the metadata catalog 324 regarding the table, such as cardinality information, statistics are to be generated. The "significant" threshold (such as changes to 15% of the table) is a way to minimize the additional costs caused by statistics generation. Of course, this could be done after each table change (incrementally in the best case) but may consume more resources than would be saved by better query plans (due to more accurate cost estimations). If statistics are not missing and there are no significant data changes (as determined at decision block 408 NO branch), the existing statistics are used by the source database system 304 (operation 412) and the method 400 ends.

If statistics are missing and/or there are significant data changes (as determined at decision block 408 YES branch), the cost of generating statistics by the source database system 304 and the target database system 308 are individually estimated (operation 416).

A check is performed to determine if the costs of generating the statistics on the target database system 308 are less than the costs of generating the statistics on the source database system 304 (decision block 420). If the costs for the target database system 308 are greater than or equal to the costs for the source database system 304 (as determined at decision block 420 NO branch), the statistics are generated on the source database system 304 (operation 424) and the method 400 proceeds with operation 440.

If the costs for the target database system 308 are less than the costs for the source database system 304 (as determined at decision block 420 YES branch), statistics generation via the target database system 308 is triggered (operation 428), statistics generation queries are performed on the target database system 308 (operation 432), and the generated statistics are sent from the target database system 308 to the metadata catalog 324 of the source database system 304 (operation 436). The statistics are generated on the target database system 308 in order to: 1) collect special statistics and histograms important for queries to execute on the source database system 304; and/or 2) collect specific statistics, such as column group statistics targeted for a specific kind of query, so as to optimize frequently run queries and/or to prepare for a specific complex query. Statistics may also be generated for use by the target database system 308.

Returning to operation 440, after the statistics are generated, the source statistics table 328 is updated in the metadata catalog 324 (operation 440) and the updated statistics are used to, for example, optimize a query plan (operation 444). For example, a plan which best matches the filter attributes may be selected by executing a subset of the original query, with a focus on cardinalities, on the target database system 308 before starting query execution on Db2® software. In one example embodiment, dynamic structured query language (SQL) is employed on a per query basis. One or more embodiments can be employed in the relational database domain where SQL is the standard. However, there are other database systems that use different query languages, such as XQuery for XML data or graph queries for graph databases; techniques disclosed herein are applicable to these databases as well.

Given the discussion thus far, it will be appreciated that, in general terms, an exemplary method, according to an aspect of the invention, includes the operations of observing table statistics 328 in a metadata catalog 324 of a source database system 304 (operation 404); estimating statistics generation costs utilizing a target database system 308 and estimating source statistics generation costs utilizing a source database system 304 (operation 416); comparing the statistics generation costs utilizing the target database system 308 and the source statistics generation costs utilizing the source database system 304 (decision block 420); triggering, by the source database system 304, statistics generation queries by the target database system 308 in response to the statistics generation costs utilizing the target database system 308 having a predefined relationship with the source statistics generation costs utilizing the source database system 304 (operation 428); performing, by the target database system 308, the statistics generation queries in response to the triggering by the source database system 304 (operation 432); sending the generated statistics from the target database system 308 to the source database system 304 in response to the triggering by the source database system 304 and the performance of the statistics generation queries (operation 436); updating the table statistics 328 in the metadata catalog 324 based on the generated statistics (operation 440); and using the updated table statistics 328 to optimize a query plan (operation 444).

In one example embodiment, the observing, estimating, and comparing operations are repeated; and statistics generation queries are performed by the source database system 304 in response to the statistics generation costs utilizing the target database system 308 being greater than or equal to the source statistics generation costs utilizing the source database system 304 (operation 424) for the repeated steps. In one example embodiment, the observing the table statistics 328 operation further comprises performing one or more of query execution, monitoring incoming changes that are processed on tables of the source database system 304, and an automated background task. In one example embodiment, existing statistics are used on the source database system 304 in response to determining that the statistics are not missing and there are no significant data changes (operation 412). In one example embodiment, a check is performed to determine if statistics are missing from the metadata catalog 324 (decision block 408), wherein the estimating, comparing, triggering, performing the statistics generation queries, sending, and updating operations are performed in response to a determination of missing statistics.

In one example embodiment, a check is performed to determine if there are significant data changes to a table of the source database system 304 (decision block 408), wherein the estimating, comparing, triggering, performing the statistics generation queries, sending, and updating operations are performed in response to a determination of significant data changes. In one example embodiment, the predefined relationship is the statistics generation costs utilizing the target database system 308 being less than the source statistics generation costs utilizing the source database system 304. In one example embodiment, the target database system 308 is optimized for statistics-like queries.

In one aspect, a non-transitory computer readable medium comprises computer executable instructions which when executed by a computer cause the computer to perform the method of observing table statistics 328 in a metadata catalog 324 of a source database system 304 (operation 404); estimating statistics generation costs utilizing a target database system 308 and estimating source statistics generation costs utilizing a source database system 304 (operation 416); comparing the statistics generation costs utilizing the target database system 308 and the source statistics generation costs utilizing the source database system 304 (decision block 420); triggering, by the source database system 304, statistics generation queries by the target database system 308 in response to the statistics generation costs utilizing the target database system 308 having a predefined relationship with the source statistics generation costs utilizing the source database system 304 (operation 428); performing, by the target database system 308, the statistics generation queries in response to the triggering by the source database system 304 (operation 432); sending the generated statistics from the target database system 308 to the source database system 304 in response to the triggering by the source database system 304 and the performance of the statistics generation queries (operation 436); updating the table statistics 328 in the metadata catalog 324 based on the generated statistics (operation 440); and using the updated table statistics 328 to optimize a query plan (operation 444).

In one aspect, a system comprises a source database system 304, the source database system 304 comprising at least one first processor, coupled to a first memory; a target database system 308, the target database system 308 comprising at least one second processor, coupled to a second memory, and the system operative to perform operations comprising: observing table statistics 328 in a metadata catalog 324 of the source database system 304 (operation 404); estimating statistics generation costs utilizing a target database system 308 and estimating source statistics generation costs utilizing a source database system 304 (operation 416); comparing the statistics generation costs utilizing the target database system 308 and the source statistics generation costs utilizing the source database system 304 (decision block 420); triggering, by the source database system 304, statistics generation queries by the target database system 308 in response to the statistics generation costs utilizing the target database system 308 having a predefined relationship with the source statistics generation costs utilizing the source database system 304 (operation 428); performing, by the target database system 308, the statistics generation queries in response to the triggering by the source database system 304 (operation 432); sending the generated statistics from the target database system 308 to the source database system 304 in response to the triggering by the source database system 304 and the performance of the statistics generation queries (operation 436); updating the table statistics 328 in the metadata catalog 324 based on the generated statistics (operation 440); and using the updated table statistics 328 to optimize a query plan (operation 444).

Figure 5:
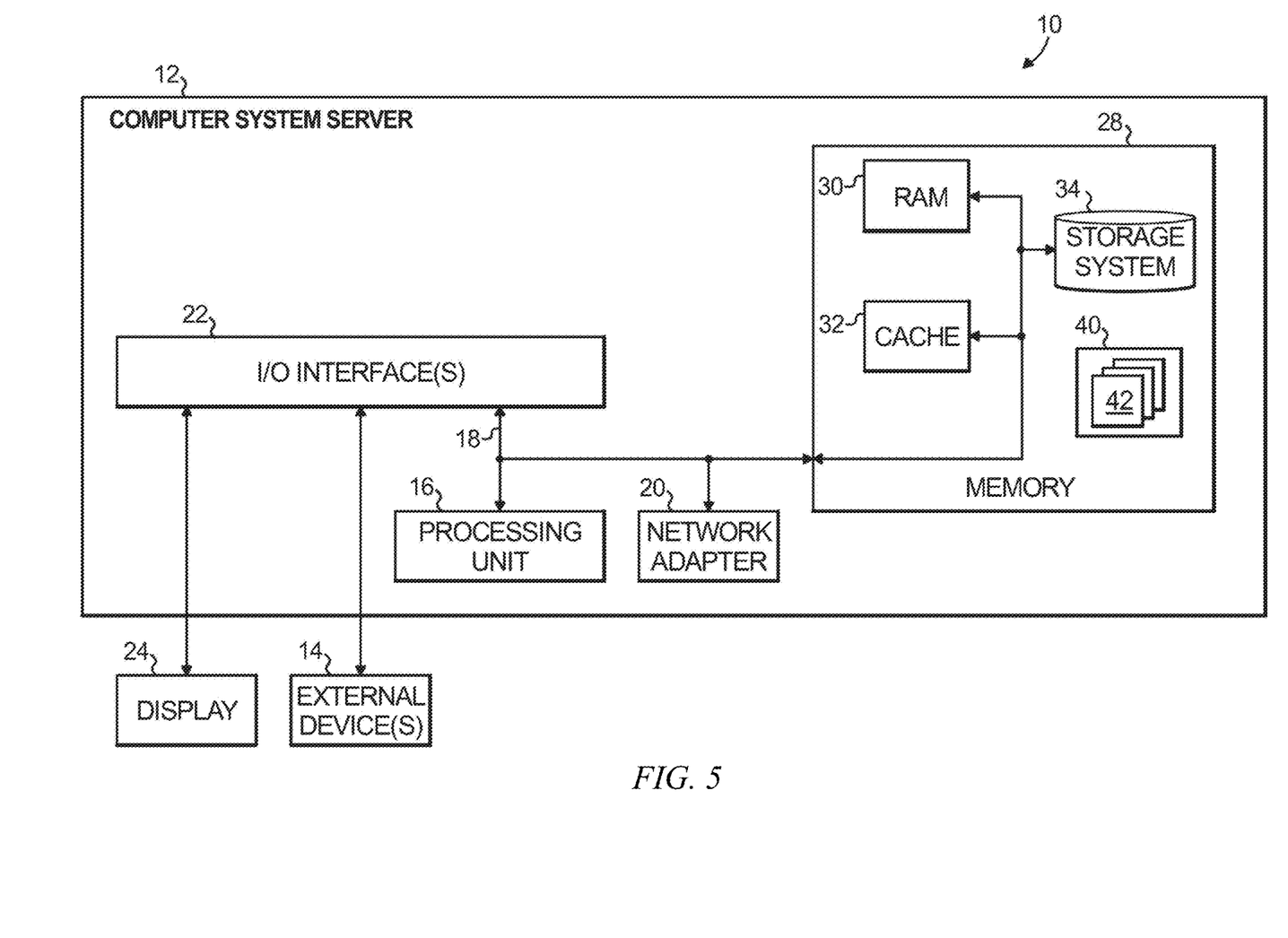
FIG. 5 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 observing table statistics in a metadata catalog of a source database system;

estimating statistics generation costs utilizing a target database system and estimating source statistics generation costs utilizing a source database system;
comparing the statistics generation costs utilizing the target database system and the source statistics generation costs utilizing the source database system;
triggering, by the source database system, statistics generation queries by the target database system in response to the statistics generation costs utilizing the target database system having a predefined relationship with the source statistics generation costs utilizing the source database system;
performing, by the target database system, the statistics generation queries in response to the triggering by the source database system;
sending the generated statistics from the target database system to the source database system in response to the triggering by the source database system and the performance of the statistics generation queries;
updating the table statistics in the metadata catalog based on the generated statistics; and
using the updated table statistics to optimize a query plan.

2. The method of claim 1, further comprising:
repeating the observing, estimating, and comparing operations; and
performing, by the source database system, statistics generation queries in response to the statistics generation costs utilizing the target database system being greater than or equal to the source statistics generation costs utilizing the source database system for the repeated steps.

3. The method of claim 1, wherein the observing the table statistics further comprises performing one or more of query execution, monitoring incoming changes that are processed on tables of the source database system, and an automated background task.

4. The method of claim 1, further comprising using existing statistics on the source database system in response to determining that the statistics are not missing and there are no significant data changes.

5. The method of claim 1, further comprising performing a check to determine if statistics are missing from the metadata catalog, wherein the estimating, comparing, triggering, performing the statistics generation queries, sending, and updating operations are performed in response to a determination of missing statistics.

6. The method of claim 1, further comprising performing a check to determine if there are significant data changes to a table of the source database system, wherein the estimating, comparing, triggering, performing the statistics generation queries, sending, and updating operations are performed in response to a determination of significant data changes.

7. The method of claim 1, wherein the predefined relationship is the statistics generation costs utilizing the target database system being less than the source statistics generation costs utilizing the source database system.

8. A non-transitory computer readable medium comprising computer executable instructions which when executed by a computer cause the computer to perform the method of:
observing table statistics in a metadata catalog of a source database system;
estimating statistics generation costs utilizing a target database system and estimating source statistics generation costs utilizing a source database system;
comparing the statistics generation costs utilizing the target database system and the source statistics generation costs utilizing the source database system;
triggering, by the source database system, statistics generation queries by the target database system in response to the statistics generation costs utilizing the target database system having a predefined relationship with the source statistics generation costs utilizing the source database system;
performing, by the target database system, the statistics generation queries in response to the triggering by the source database system;
sending the generated statistics from the target database system to the source database system in response to the triggering by the source database system and the performance of the statistics generation queries;
updating the table statistics in the metadata catalog based on the generated statistics; and
using the updated table statistics to optimize a query plan.

9. The non-transitory computer readable medium of claim 8, the operations further comprising:
repeating the observing, estimating, and comparing operations; and
performing, by the source database system, statistics generation queries in response to the statistics generation costs utilizing the target database system being greater than or equal to the source statistics generation costs utilizing the source database system.

10. The non-transitory computer readable medium of claim 8, wherein the predefined relationship is the statistics generation costs utilizing the target database system 308 being within a specified threshold of the source statistics generation costs utilizing the source database system.

11. The non-transitory computer readable medium of claim 8, the operations further comprising using existing statistics on the source database system in response to determining that the statistics are not missing and there are no significant data changes.

12. The non-transitory computer readable medium of claim 8, the operations further comprising performing a check to determine if statistics are missing from the metadata catalog, wherein the estimating, comparing, triggering, performing the statistics generation queries, sending, and updating operations are performed in response to a determination of missing statistics.

13. The non-transitory computer readable medium of claim 8, the operations further comprising performing a check to determine if there are significant data changes to a table of the source database system, wherein the estimating, comparing, triggering, performing the statistics generation queries, sending, and updating operations are performed in response to a determination of significant data changes.

14. A system comprising:
a source database system, the source database system comprising at least one first processor, coupled to a first memory;
a target database system, the target database system comprising at least one second processor, coupled to a second memory, and the system operative to perform operations comprising:
observing table statistics in a metadata catalog of the source database system;
estimating statistics generation costs utilizing a target database system and estimating source statistics generation costs utilizing a source database system;
comparing the statistics generation costs utilizing the target database system and the source statistics generation costs utilizing the source database system;
triggering, by the source database system, statistics generation queries by the target database system in response to the statistics generation costs utilizing the target database system having a predefined relationship with the source statistics generation costs utilizing the source database system;

performing, by the target database system, the statistics generation queries in response to the triggering by the source database system;

sending the generated statistics from the target database system to the source database system in response to the triggering by the source database system and the performance of the statistics generation queries;

updating the table statistics in the metadata catalog based on the generated statistics; and using the updated table statistics to optimize a query plan.

15. The system of claim 14, the operations further comprising:

repeating the observing, estimating, and comparing operations; and performing, by the source database system, statistics generation queries in response to the statistics generation costs utilizing the target database system being greater than or equal to the source statistics generation costs utilizing the source database system.

16. The system of claim 14, wherein the observing the table statistics further comprises performing one or more of query execution, update processing, and an automated background task.

17. The system of claim 14, the operations further comprising using existing statistics on the source database system in response to determining that the statistics are not missing and there are no significant data changes.

18. The system of claim 14, the operations further comprising performing a check to determine if statistics are missing from the metadata catalog, wherein the estimating, comparing, triggering, performing the statistics generation queries, sending, and updating operations are performed in response to a determination of missing statistics.

19. The system of claim 14, the operations further comprising performing a check to determine if there are significant data changes to a table of the source database system, wherein the estimating, comparing, triggering, performing the statistics generation queries, sending, and updating operations are performed in response to a determination of significant data changes.

20. The system of claim 14, wherein the target database system is optimized for statistics-like queries.

* * * * *